3,306,757
HIGH ALKALI EARTH OXIDE GLASS BEAD COMPOSITION
Vincent L. Duval d'Adrian, 7823 Kenridge Lane, Shrewsbury, Mo. 63019
No Drawing. Original application June 18, 1957, Ser. No. 666,471. Divided and this application Feb. 18, 1963, Ser. No. 284,275
5 Claims. (Cl. 106—54)

This application is a division of my application Serial No. 666,471, filed June 18, 1957, now abandoned.

This invention relates to improvements in glass bead compositions and in particular is concerned with a glass bead composition having a relatively high refractive index in which the glass composition can be fused to a molten glass having a low viscosity.

The glass beads of this invention find particular utility as reflective beads used in highway marking paints, roadside signs which are adapted to be illuminated at night and for the reflective illumination of other coated surfaces such as those that use a plastic sheeting, etc., through reflection from a beam of light directed upon the surface. Such glass beads are of quite small particle size and for optimum reflective brilliance should be of truly spherical configuration.

In the past, soda lime glass beads have been conventionally used. These beads have a refractive index in the range of about 1.50 to about 1.55. There are several objections to the use of such soda lime glass beads. One such objection is the relatively low refractive index which prevents optimum reflection from the directed beam of light such as the headlight of an automobile.

Another objection is the high viscosity of the molten soda lime glass, which is an undesirable characteristic in the process of making the beads and can quite often cause the formation of ovate, or other non-spherical beads, or beads having air bubbles.

By means of the instant invention there has been provided novel glass compositions which are high in lime or other alkali earth oxides.

For the purpose of this application it is to be understood that the term "alkali earth oxide" includes the oxides of calcium, magnesium, barium and strontium. These glass bead compositions which comprise lime, silica or titanium dioxide and a flux such as borax or boric acid, or other substitutions in whole or in part of magnesium, barium or strontium oxides for the lime, provide a bead having a variable refractive index substantially higher than soda lime glass. Further, by means of this invention, the novel glass compositions make possible a molten glass at conventional glass making temperatures that has a very low viscosity which is of great advantage in the manufacture of truly spherical glass beads.

As a further consequence of this invention it has been found that various glass components, which have previously been considered necessary, can be deleted in the production of glass beads and that there can still be produced a superior glass bead of high refractive index and a truly spherical configuration. Additionally, a glass bead can be produced which is quite durable to weathering and can be made from conventional stock components within a low cost basis. The production can be carried out at glass making temperatures of about 2200 degrees to about 2800 degrees Fahrenheit without any necessity of annealing.

Accordingly it is a principal object of this invention to provide a novel glass composition which can be used in making glass beads of relatively high refractive index and in which the molten composition has a very low viscosity.

It is a further object of this invention to provide a charge for the production of glass beads in which the charge has a high proportion of lime, magnesium, barium or strontium oxide yielding components of about roughly one-half or more of the weight of the charge and in which a low viscosity of the molten glass in the fusion process is obtained.

Still another object of this invention is to provide a charge for the production of glass beads having a relatively high refractive index in which about one-half or more of the weight of the charge is a component yielding an alkali earth oxide and the rest of the charge is made up of silica or titanium dioxide and a flux of borax or boric acid in which the silica or titanium dioxide predominate over the borax or boric acid.

Still another object of this invention is to provide a truly spherical glass bead composition of relatively high refractive index in which a low viscosity of the molten glass is obtained and in which the charge is composed essentially of about one-half or more of the weight of the charge in a calcium oxide yielding component with the rest of the charge being made up of silica or titanium dioxide and a flux in which the silica or titanium dioxide is in substantial excess to the flux.

Further objects of this invention will appear in the detailed description which follows and will be further apparent to those skilled in the art.

In the production of glass beads for reflective use in paints and coatings or plastic sheetings used upon surfaces and the like for nighttime illumination, glass beads are conventionally made in varying small particle sizes ranging all the way from about 20 mesh down to 230 mesh, U.S. standard screen size. I have found in this invention that a stock feed of very low cost can be made from conventionally occurring raw materials which can be used in an improved glass bead.

The improved glass bead composition of this invention is quite superior over the conventionally used soda lime glass bead. Thus, the glass beads of this invention have a high refractive index which is in the range of about 1.56 to about 1.66. These refractive indices can be even further increased where the rutile form of titanium dioxide is employed, preferably with a higher refractive index alkali earth oxide as barium oxide. The beads can be made from a resulting very low viscosity glass melt to obtain more truly spherical glass beads. The soda lime glasses conventionally used in the past have been objectionable because of the high viscosity and imperfect bead formation and the glass bead compositions in this invention therefore represent a significant advance in this art.

The principal components employed in the novel glass bead composition of this invention may be lime, silica and borax. Where desired, magnesium, barium and strontium oxides may be substituted for the lime. Thus, barium oxide may be employed if a somewhat higher refractive index is desired to be obtained, although this will be done at the expense of using a lesser cost component since the lime is somewhat cheaper as it is more readily available. When speaking of the alkali earth oxides employed, it is to be understood that various compositions can be employed which are converted into these oxides at the high glass making fusion temperatures. Thus the carbonates of calcium, barium, and strontium may be employed. Such compounds as the sulfates which have a deleterious action or other compositions which deposit a foreign ingredient are avoided. Also it is to be understood that the refractive index of the glass bead composition may be varied by the choice of the particular alkali earth oxide. These oxides have the following refractive indices:

CaO _____ 1.838
MgO _____ 1.736
SrO _____ 1.870
BaO _____ 1.98

Also titanium dioxide in the rutile form may be employed, in part or as a complete substitution for silica, to increase the refractive index. The fluxing agents found most desirable are boric acid and borax which seem to be equally suitable except that when lime is employed borax is preferable. Boric acid with lime in the glass melt has an unexpectedly corrosive action which makes it undesirable.

I have found that a number of desirable charges can be employed. One such formulation is that shown below in which the word "parts" means parts by weight:

*Example I*

|  | Parts |
|---|---|
| $CaCO_3$ | 100 |
| $SiO_2$ | 75 |
| $Na_2B_4O_7 \cdot 10H_2O$ | 30 |

This charge can be easily melted at a temperature of 2700 to 2800 degrees Fahrenheit at which temperature it has a very low viscosity which somewhat approximates the viscosity of 10 to 20 weight SAE motor oil. In this glass composition the lime is employed because of its high fluidity aspects. The silica is employed because of its ready availability and its convenience as a standard $R_2O$ component of glass compositions. The borax is of advantage through its fluxing qualities and because the resultant $B_2O_3$ which is formed at the glass making temperatures has quite good weathering aspects.

The charge listed in Example I above can be varied within reasonable limits. Thus it has been found that a slightly higher refractive index glass bead can be produced by using a smaller amount of silica plus a small amount of barium carbonate which aids in fluxing the melt. Such a formulation is listed below:

*Example II*

|  | Parts |
|---|---|
| $CaCO_3$ | 103 |
| $SiO_2$ | 60 |
| $Na_2B_4O_7 \cdot 10H_2O$ | 30 |
| $BaCO_3$ | 1 |

The glass charge listed in Example II can be melted and made into glass beads having a refractive index of about 1.61. This formulation is suitable for large scale production and is of advantage when a slightly higher refractive index is desired. However, the formulation is made at the expense of a slightly higher proportion with respect to the silica of lime and borax which are more expensive components.

In addition the proportion of the calcium carbonate can be increased quite substantially in proportion to the other components. As an example, formulation III listed below, was melted at a melting temperature of 2600° F. and was found to have a very low viscosity of less than #10 SAE oil. This bead also had a higher refractive index of 1.622.

*Example III*

|  | Parts |
|---|---|
| $CaCO_3$ | 100 |
| $Na_2B_4O_7 \cdot 5H_2O$ | 12 |
| $SiO_2$ | 25 |

Further, the borax may be reduced from the amounts shown in Examples I, II and III. However, a somewhat higher temperature is required to melt the glass. The examples listed above are illustrative only and it will be realized and understood by those skilled in the art that various changes may be made in the teaching of this invention.

Other formulations which use the alkali earth oxide yielding compound in the amount of about one-half or more of the weight of the charge can be advantageously employed and still obtain a high degree of fluidity in the glass melt. Thus barium carbonate has been used with success. There is listed below a charge which has been found quite satisfactory:

*Example IV*

| | Wt. | Percent | R.I. |
|---|---|---|---|
| 20 parts $BaCO_3$, 12 parts $SiO_2$, 8 parts $Na_2B_4O_7 \cdot 5H_2O$: | | | |
| BaO | 15.6 | 47.3 | 1.610 |
| $SiO_2$ | 12.0 | 36.4 | |
| $B_2O_3$ | 3.8 | 11.5 | |
| $Na_2O$ | 1.6 | 4.8 | |
| | 33.0 | 100.0 | |

This composition was melted at 2520° F. and had a viscosity in the general range of 10 to 20 SAE motor oil. The resultant glass beads had a refractive index of 1.610.

The composition of Example IV was varied to use a higher proportion of barium carbonate in accordance with the following formulation:

*Example V*

| | Wt. | Percent | R.I. |
|---|---|---|---|
| 60 parts $BaCO_3$, 28 parts $SiO_2$, 12 parts $Na_2B_4O_7 \cdot 5H_2O$: | | | |
| BaO | 46.6 | 56.4 | 1.616 |
| $SiO_2$ | 28.0 | 33.8 | |
| $B_2O_3$ | 5.8 | 7.0 | |
| $Na_2O$ | 2.5 | 3.0 | |
| | 82.9 | 100.2 | |

The above formulation melted satisfactorily at 2520° F. and had a slightly lower viscosity than the molten glass of Example IV. This slightly lower viscosity was coupled with a slightly higher refractive index of 1.616.

It was found that the refractive index could be increased substantially by increasing the proportion of barium carbonate. In the formulation listed below a glass was produced at a temperature of 2300° F. to produce glass beads having a refractive index of 1.654. This bead, however, has somewhat less durability than those of the previous examples, although it has a desirable viscosity of substantially less than #10 SAE oil. The durability factor is considered not to be highly objectionable since the possible attack by moisture which is the undesirable feature noted, may be obviated by protective coatings.

*Example VI*

| | Wt. | Percent | R.I. |
|---|---|---|---|
| 100 parts $BaCO_3$, 15 parts $H_3BO_3$, 25 parts $SiO_2$: | | | |
| BaO | 77.8 | 70.0 | 1.654 |
| $B_2O_3$ | 8.3 | 7.5 | |
| $SiO_2$ | 25.0 | 22.5 | |
| | 111.1 | 100.0 | |

The flux in Example V was changed to boric acid to illustrate the range of fluxes that can be satisfactorily employed. This composition resulted in a glass having the same characteristics of low viscosity and the same refractive index. The charge composition is listed as follows:

Example VII

| | Wt. | Percent | R.I. |
|---|---|---|---|
| 60 parts BaCO₃, 28 parts SiO₂, 12 parts H₃BO₃: | | | |
| BaO | 46.6 | 57.3 | 1.616 |
| SiO₂ | 28 | 34.4 | |
| B₂O₃ | 6.7 | 8.2 | |
| | 81.3 | 99.9 | |

A still further formulation was made employing a higher proportion of barium carbonate in which a glass was produced having a viscosity approximating that of 10 to 20 SAE motor oil when melted at 2500 to 2600° F. The glass beads produced from this formulation listed below also had a higher refractive index of 1.64.

Example VIII

| | Wt. | Percent | R.I. |
|---|---|---|---|
| 175 parts BaCO₃, 60 parts SiO₂, 30 parts H₃BO₃: | | | |
| BaO | 136 | 64.0 | 1.64 |
| SiO₂ | 60 | 28.2 | |
| B₂O₃ | 16.7 | 7.9 | |
| | 212.7 | 100.0 | |

Strontium oxide yielding components can be used in the glass compositions of this invention. A formulation is listed below which provides a glass melting at 2520° F. and which has a low viscosity in the general range of 10 to 20 SAE motor oil. This glass had a refractive index of 1.60.

Example IX

| | Parts |
|---|---|
| SrCO₃ | 60 |
| SiO₂ | 28 |
| Na₂B₄O₇·5H₂O | 12 |

Magnesium oxide yielding components can also be employed. When so used a glass having a lower refractive index is obtained which may be desired for special application such as for beaded movie screens where a certain amount of dispersion is desirable. In such applications magnesium carbonate or similar oxide yielding compounds, may be used alone or in admixture with other alkaline earth oxide yielding compounds, e.g. dolomitic limestone, etc. A satisfactory formulation is listed below which produced a glass having a refractive index of 1.562.

Example X

| | Parts |
|---|---|
| MgCO₃ | 60 |
| SiO₂ | 28 |
| Na₂B₄O₇·5H₂O | 12 |

This formulation, due to the influence of magnesium oxide, had a slightly higher viscosity at 2520° F. than the examples listed immediately above. However, when heated to 2700° F. the viscosity was satisfactorily reduced to a high degree of fluidity.

It has further been found that the refractive index can be increased still further in this invention by substituting the rutile form of titanium dioxide for silica. This substitution may be made in part or in whole depending upon the desired elevation in refractive index. When titanium dioxide is used in substantial quantities it may be further desirable to employ barium peroxide as an additional agent. Undesirable color caused by the titanium dioxide may be avoided by such usage. A suitable formulation is listed below typifying such use of titanium dioxide:

Example XI

| | Wt. | Percent | R.I. |
|---|---|---|---|
| 150 parts BaCO₃, 70 parts TiO₂, 45 parts H₃BO₃, 6 parts BaO₂: | | | |
| BaO | 121.9 | 56.2 | 1.91–1.92 |
| TiO₂ | 70.0 | 32.2 | |
| B₂O₃ | 25.0 | 11.5 | |
| | 216.9 | 99.9 | |

The glass produced by the foregoing composition had a high degree of fluidity when melted. The refractive index is in the range of about 1.91 to 1.92, which is quite advantageous for reflective illumination at nighttime upon highway marking paints and roadside signs which are illuminated by automobile headlights.

In another example a small proportion of titanium dioxide was employed with silica and barium carbonate as follows:

Example XII

| | Wt. | Percent | R.I. |
|---|---|---|---|
| 175 parts BaCO₃, 60 parts SiO₂, 10 parts TiO₂, 45 parts H₃BO₃: | | | |
| BaO | 136 | 59.0 | 1.657 |
| SiO₂ | 60 | 26.0 | |
| TiO₂ | 10 | 4.3 | |
| B₂O₃ | 25 | 10.7 | |
| | 231.0 | 100.0 | |

This composition was easily melted at 2400° F. at which temperature it had a fluidity which was less than that of 10 SAE motor oil. The refractive index of the glass beads produced was 1.657.

In still another example equal parts of silica and the rutile form of titanium dioxide were employed in a formulation which was otherwise the same as Example XII. In this formulation listed below it was found that the glass beads produced had a substantially higher refractive index of about 1.75.

Example XIII

| | Wt. | Percent | R.I. |
|---|---|---|---|
| 175 parts BaCO₃, 35 parts SiO₂, 35 parts TiO₂, 45 parts H₂BO₃: | | | |
| BaO | 136 | 59.0 | 1.75 |
| SiO₂ | 35 | 15.15 | |
| TiO₂ | 35 | 15.15 | |
| B₂O₃ | 25 | 10.7 | |
| | 231 | 100.0 | |

This composition produced a glass which was unexpectedly found to have a very low melting point of 2200° F. at which temperature it had a high degree of fluidity which was less than that of 10 SAE motor oil. This was particularly unexpected since increases or decreases in the relative proportion of titanium dioxide caused an elevation of the melting temperature. The advantage of this composition is quite important because the low temperature makes possible the production of a glass bead having a high refractive index at relatively low temperature with attendant fuel savings.

Other RO₂ compounds may be used besides titanium dioxide in replacement of the silica to illustrate the compatibility of the formulations of this invention. Thus zircon, i.e., zirconium silicate can be employed as shown in the following example:

Example XIV

| | Parts |
|---|---|
| CaCO₃ | 150 |
| SiO₂ | 50 |
| ZrSiO₄ | 20 |
| Na₂B₄O₇·5H₂O | 45 |

This glass composition was melted at 2300° F. and had a fluidity of less than 10 SAE oil at this temperature. The glass beads had a relatively high index of refraction of 1.634 due largely to the use of the zircon.

The glass bead compositions made according to the charge of this invention need no other constituents than those listed above. Thus aluminum and lead, which have been conventionally employed to increase durability of refractive index and have been thought necessary, are avoided. It will be noted that all of these components increase viscosity and would be objectionable on this ground. Additionally, iron is avoided in the instant invention since this gives an objectionable color.

Accordingly there can be produced by the teaching of this invention, a substantially crystal clear or water white glass bead of a high refractive index. This glass bead can be produced at conventional glass making temperatures in substantially truly spherical form since the molten glass obtained through the novel charge provided herein is of quite low viscosity. The resultant glass bead composition has a high degree of durability and weather resistance and is particularly well adapted for use for the purposes above described. Since the basic components utilized are readily available and are of low cost, the glass bead composition is of particularly great advantage to the industry. Thus there is provided an improved glass bead which can be produced at extremely low cost in the range of presently produced soda lime glass.

As a further consequence of this invention it has been found that the molten glass when formed into glass beads needs no annealing. In the glass bead making processes a very quick quench by rapid reduction in temperature is normally and conventionally practiced. These types of processes can be used with the glass composition of this invention and no objectionable devitrification appears. This feature of not requiring an annealing step in the glass compositions of this invention for the production of glass beads is a very desirable feature and particularly suits these glass compositions for such production.

Various changes and modifications may be made in the glass compositions of this invention as will be apparent to those skilled in the art. Such modifications and changes are within the scope and teaching of this invention and are to be included therein.

What is claimed is:

1. A substantially perfectly spherical high refractive index glass bead for use in reflective paints and being of a size from about 20 mesh to 230 mesh having a refractive index of about 1.60 to 1.75 prepared from a charge characterized by a low viscosity at 2200° F. to 2800° F. and consisting essentially of at least two members of the group consisting of silica, titanium dioxide and zircon, at least one of said members being silica, a flux in a lesser amount than said first named component and consisting of at least one member of the group consisting of borax and boric acid and a barium compound which is convertible at high temperature to an oxide, said barium compound being present in the charge in the amount of at least about one-half the weight of the charge, and said charge being fusible to a low viscosity.

2. A substantially perfectly spherical high refractive index glass bead for use in reflective paints and being of a size from about 20 mesh to 230 mesh having a refractive index of about 1.60 to 1.75 prepared from a charge consisting essentially of at least two members of the group consisting of silica, titanium dioxide and zircon, at least one of said members being silica, a flux in a lesser amount than said first named component and consisting of at least one member of the group consisting of borax and boric acid, and a barium oxide yielding compound, said barium compound being present in the charge in the amount of at least about one-half the weight of the charge, said charge being fusible at a temperature between about 2200° F. to about 2800° F. to a molten glass having a low viscosity, and being formable to glass beads without the requirement of annealing.

3. A substantially perfectly spherical high refractive index glass bead for use in reflective paints and being of a size from about 20 mesh to 230 mesh having a refractive index of about 1.60 to 1.75 prepared from a charge consisting essentially of about equal parts by weight of silica and titanium dioxide, a flux in a lesser amount than said first named component and consisting of at least one member of the group consisting of borax and boric acid, and a barium oxide yielding compound, said barium compound being present in the charge in the amount of at least about one-half the weight of the charge, said charge being fusible at a temperature of about 2200° F. to a molten glass having a low viscosity, and being formable to glass beads without the requirement of annealing.

4. A substantially spherical transparent glass bead having a refractive index of about 1.65 to 1.75 and a mesh size of about 20 to 230 mesh and consisting essentially of at least about 47% by weight of an alkaline earth compound consisting essentially of barium oxide, at least about 7% boron oxide and at least about 22% of at least two members of the group consisting of silica, titanium dioxide and zirconium oxide, at least one of said members being silica.

5. A substantially spherical transparent glass bead having a refractive index of about 1.65 to 1.75 and a mesh size of about 20 to 230 mesh and consisting essentially of at least about 47% by weight of an alkaline earth compound consisting essentially of barium oxide, at least about 7% boron oxide and at least about 22% of a mixture of silica and titanium dioxide.

References Cited by the Examiner

UNITED STATES PATENTS

| 2,220,765 | 11/1940 | Hirose et al. | 106—52 |
| 2,606,841 | 8/1952 | Armistead | 106—47 |
| 2,790,723 | 4/1957 | Stradley et al. | 106—54 |
| 2,980,547 | 4/1961 | Duval d'Adrian | 106—47 |
| 3,041,191 | 6/1962 | Duval d'Adrian | 106—47 |

HELEN M. McCARTHY, *Acting Primary Examiner.*

TOBIAS E. LEVOW, *Assistant Examiner.*

UNITED STATES PATENT OFFICE
CERTIFICATE OF CORRECTION

Patent No. 3,306,757                Dated February 28, 1967

Inventor(s) Vincent L. Duval d'Adrian

It is certified that error appears in the above-identified patent and that said Letters Patent are hereby corrected as shown below:

Vincent L. Duval d'Adrian, 7823 Kenridge Lane, Shrewsbury Missouri 63119, assignor by mesne assignment to General Steel Industries, Inc., Granite City, Illinois, a corporation of Delaware.

Signed and sealed this 17th day of August 1971.

(SEAL)
Attest:

EDWARD M. FLETCHER, JR.
Attesting Officer

WILLIAM E. SCHUYLER, JR.
Commissioner of Patents